Aug. 7, 1956  J. H. BOLLES ET AL  2,757,615
WINDOW WASHER PUMP
Filed March 16, 1953
Fig.1
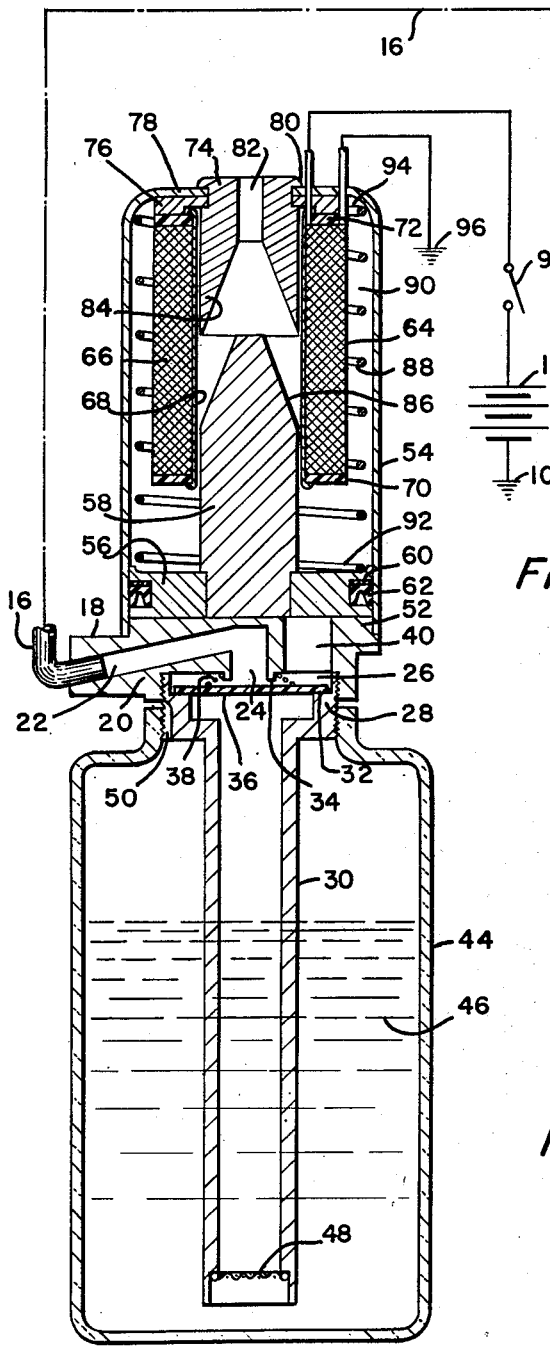
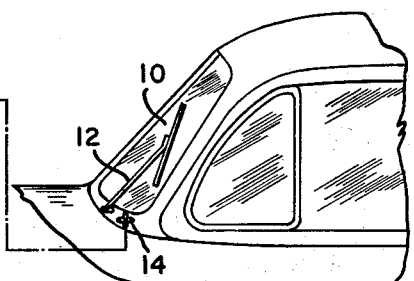
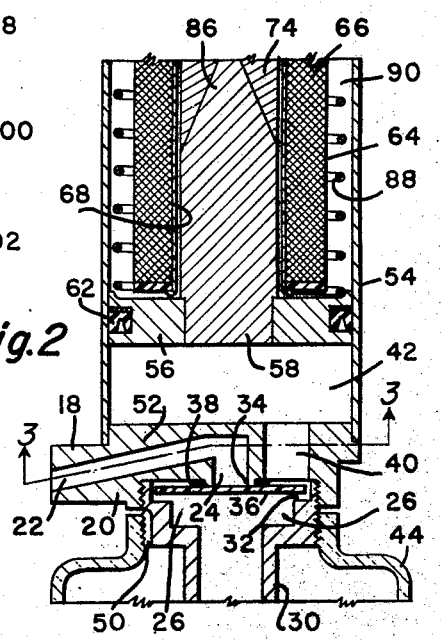
Fig.2
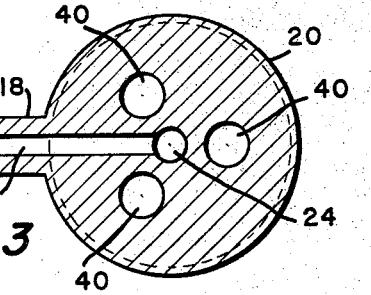
Fig.3
Inventors
Julius H. Bolles
Charles E. Buck
Brooks H. Short
Argyle G. Lautzenhiser
Craig V. Morton
Attorney

United States Patent Office 2,757,615
Patented Aug. 7, 1956

2,757,615

WINDOW WASHER PUMP

Julius H. Bolles, Charles E. Buck, Brooks H. Short, and Argyle G. Lautzenhiser, Anderson, Ind., assignors to General Motors Corporation, Detroit, Mich., a corporation of Delaware Application March 16, 1953, Serial No. 342,534

5 Claims. (Cl. 103—53)

This invention relates to electrically actuated pumps of the solenoid type for squirting water on windshields of an automobile.

It is an object of the invention to provide a pump mechanism that will respond to momentary closing of an electric circuit for withdrawing a charge of window cleaning medium from a reservoir and deposit the same upon an automobile windshield.

The object is accomplished in this instance by means of a valve housing providing intake and outlet valve seats, between which a spring pressed valve moves to control the flow of window washing medium. Fixed to the valve housing there is a tubular casing that provides a pump cylinder open to the valve chamber, the pump chamber being traversed by a piston having a plunger disposed in the field of a solenoid winding which is enclosed by the same casing element providing the pump chamber. A momentary closing of the circuit through the solenoid attracts the plunger and piston to enlarge the pump chamber so that the medium may flow through the intake valve preparatory to being forced through the nozzle and squirted on the windshield. Spring return means acting upon the pump piston collapses the pump chamber and forces the window washing medium through the outlet means.

Further objects and advantages of the present invention will be apparent from the following description reference being had to the accompanying drawings wherein a preferred embodiment of the present invention is clearly shown.

In the drawing:

Fig. 1 is a schematic layout of a window washing system for an automobile showing the pump device in longitudinal section with the pump mechanism in the rest or deactivated condition.

Fig. 2 is a fragmentary view of the pump mechanism showing the parts in activated position and;

Fig. 3 is a transverse sectional view through the valve housing substantially as indicated by the line and arrows 3—3 of Fig. 2.

Referring particularly to the drawings 10 indicates the windshield of an automobile fitted with a wiper 12 and a nozzle 14 for delivering the window washing medium upon the glass of windshield 10. The nozzle 14 is connected by tube or pipeage 16 with a boss 18 of a valve housing 20. The valve housing 20 has a passage 22 connected with the pipe 16 and opening at 24 into the center of a shallow recess 26 forming a valve chamber, into which is threaded a flange 28 of an intake tube 30. The tube 30 provides a circular ledge 32 as an intake valve seat which is concentric with a lip or rib 34 to provide an outlet valve seat. The valve seats 32 and 34 are concentric with one another and axially spaced from one another to receive a valve disc 36 held against the valve seat 32 by means of a spring 38. The valve housing 20 is provided with a plurality of openings 40 connecting the valve chamber 26 to a pump chamber 42. The inlet tube 30 terminates proximate the bottom of a reservoir 44 containing a window cleaning medium 46 that must pass through a filter 48 on its way to the valve chamber 26. The reservoir 44 is threaded or otherwise secured upon the flange head 28 of the inlet tube, the flange having a saw kerf, or notch or other passage 50 which opens the interior of the reservoir 44 to atmosphere.

The valve housing 20 has a cylindrical portion 52 surrounding the group of openings 40 to form a seat for one end of a tubular casing 54 providing a circular boundary for the pump chamber 42. Disposed across the bore of the casing 54 there is a piston head 56 secured to a plunger 58 and peripherally grooved at 60 to enclose a fluid seal ring 62. The casing 54 is extended axially to enclose a solenoid 64 operable upon the piston plunger 58. The solenoid 64 comprises a winding 66 disposed on a brass sleeve 68 and confined between two head members 70 and 72. A core member 74, to which the solenoid is secured, passes through a metal washer 76 and a bottom wall 78 of the casing 54 where it is riveted or peened over at 80. An axial passage 82 in the core 74 flares outwardly at 84 to form a frusto conical, or tapered air gap cooperating with a frusto conical, or tapered portion 86 provided at the end of the plunger 58. A return spring 88 is disposed in the annular space 90 between the extension of the casing 54 and the solenoid winding 66 and has its end turns 92 and 94 seated against the bottom 78 of the housing and against the piston head 56. The winding 66 is connected to ground at 96 and with the switch 98 and battery 100 grounded at 102. In the rest or inactivated condition, the piston head normally engages the face of the cylindrical portion 52 so that the pump chamber 42 is at a minimum volume.

When the switch 98 is momentarily closed energization of the winding 66 attracts the plunger 58 and raises the piston 56 from the position shown in Fig. 1 to that shown in Fig. 2. The chamber 42 being enlarged and reduced in pressure, the valve 36 rises to close the port 24 and open port 32 as shown in Fig. 2. Since there is reduced pressure in the chamber 42, the ports 40, the chamber 26 and the bore of tube 30, atmosphere then operates through opening 50 upon the surface of the liquid in the reservoir 44 to force the window washing medium through the valve chamber 26 into the pump chamber 42. The momentary closure of the switch 98 is sufficient to energize the solenoid winding and raise the piston 56. As soon as the solenoid winding is deenergized the spring 88 presses the piston 66 downwardly so that the valve disc 36 reengages the valve seat 32 such as is shown in Fig. 1. The window washing medium in 42 is then forced through 40 into 26 and outwardly by way of port 24, passage 22 and pipe 16 to be ejected upon the windshield 10 by the nozzle 14. By these combined elements a pump mechanism can be constructed that will have a displacement of about 30 cubic centimeters and require practically .4 of a second closure time for the intake stroke, and requires 7 seconds' discharge time using two washing nozzles 14 which delivers ample window washing medium for cleaning the windshield 10 while the wipers 12 are in operation.

While the embodiment of the present invention as herein disclosed, constitutes a preferred form, it is to be understood that other forms might be adopted.

What is claimed is as follows:

1. In a system for washing windshield of automobiles, a reciprocating pump adapted to deposit a window washing medium to the windshield in response to instantaneous energization of a magnet coil, said pump comprising a valve housing having a cylindrical portion and a valve chamber, said valve chamber having axially spaced inlet and outlet ports, a deep drawn cup of magnet material having a rim portion secured to the cylindrical portion of said valve housing, a solenoid winding secured in the cup so as to form a cylindrical pumping chamber between said valve housing and the end of said solenoid, a piston traversing said cylindrical chamber, a plunger secured thereto and disposed in the field of said solenoid, spring means surrounding the solenoid and urging the piston against the valve housing which normally collapses said cylindrical chamber, passage means interconnecting the valve chamber and the pumping chamber, and a valve disc disposed in said valve chamber, said valve disc being bodily movable for closing said outlet port during piston movement to expand said pumping chamber, and bodily movable for closing said inlet port during piston movement to collapse said pump chamber.

2. In a window washer an electrically operated pump, comprising in combination, a deep drawn cup providing a casing, a solenoid winding secured to the bottom of the cup and extending short of the rim of the cup to form a fluid cylinder between the end of the winding and the edge of the cup, a piston slidable within the cup and having a plunger traversing the axis of the solenoid, a valve housing closing the open end of the cup and engageable by said piston, a shallow recess in the valve housing constituting a valve chamber, a passage opening centrally of the valve chamber to provide an outlet port having a valve-seat, means secured in said shallow recess providing an inlet port having a valve seat, passage means connecting the valve chamber with the interior of the fluid cylinder, an imperforate valve disc disposed in said valve chamber and bodily movable into and out of engagement with both of said valve seats, and return means within the casing for urging the piston against the valve housing, whereby momentary energization of the solenoid attracts said plunger to enlarge the fluid cylinder and charge it with fluid medium admitted through said inlet port, the return means forcing the fluid medium through the outlet port upon solenoid deenergization.

3. In a window washer, an electrically operated pump comprising, a valve housing having a shallow recess constituting a valve chamber having a centrally disposed outlet port, means secured in said recess providing a concentrically disposed inlet port, said ports being axially spaced, an imperforate valve disc in said valve chamber and bodily movable to close either port, spring means engaging said valve disc and positioning said valve disc so as to close the inlet port, a cylinder attached to the opposite side of said valve housing, a piston movable within the cylinder, solenoid means operable upon the piston to move it away from said valve housing, spring return means adapted to force the piston against the valve housing, and means in the valve housing connecting the valve chamber with the interior of said cylinder.

4. In a window washer, an electrically operated pump comprising in combination, a cylindrical casing having a closed end, a solenoid winding and core member secured in said closed end and stopping short of the open end of the casing to provide a pump chamber, a piston and plunger axially movable along the cylinder and the axis of said solenoid upon energization of said solenoid, spring means surrounding the solenoid and engaging the piston to force it toward the open end of the casing, a valve housing closing the open end of the casing and having fluid passages therethrough for connecting the pump chamber with a valve chamber, said valve chamber having inlet and outlet ports, and an imperforate valve element disposed in said valve chamber and bodily movable to close either port.

5. The combination set forth in claim 4, wherein the valve housing comprises a plate having a shallow recess with a centrally disposed opening constituting said outlet port, said inlet port being axially spaced from said outlet port, and wherein said valve element comprises a non-conducting disc disposed in the chamber and normally closing the inlet port, said valve disc admitting fluid medium to the pump chamber upon momentary engerization of the solenoid, and closing the inlet port upon de-energization of the solenoid, whereby said spring return means effects a discharge of the fluid medium through said outlet port.

References Cited in the file of this patent

UNITED STATES PATENTS

| | | |
|---|---|---|
| 862,867 | Eggleston | Aug. 6, 1907 |
| 1,380,442 | Trumble | June 6, 1921 |
| 1,885,436 | Hampton | Nov. 1, 1932 |
| 2,040,580 | Vorech | May 12, 1936 |
| 2,533,965 | Schmohl et al. | Dec. 12, 1950 |
| 2,649,332 | Rappl | Aug. 18, 1953 |

FOREIGN PATENTS

| | | |
|---|---|---|
| 247,450 | Great Britain | Feb. 18, 1926 |
| 372,306 | France | Mar. 30, 1907 |